US012763471B2

(12) United States Patent
Pham et al.

(10) Patent No.: US 12,763,471 B2

(45) Date of Patent: Oct. 13, 2026

(54) BACKPLANE FOR METASURFACE ANTENNA WITH AN AMPLIFIER DRIVEN BY DRIVE CIRCUITRY

(71) Applicant: Kymeta Corporation, Redmond, WA (US)

(72) Inventors: Tung Pham, Redmond, WA (US); Ryan Stevenson, Seattle, WA (US)

(73) Assignee: Kymeta Corporation, Redmond, WA (US)

(*) Notice: Subject to any disclaimer, the term of this patent is extended or adjusted under 35 U.S.C. 154(b) by 14 days.

(21) Appl. No.: 18/893,459

(22) Filed: Sep. 23, 2024

(65) Prior Publication Data

US 2025/0105518 A1 Mar. 27, 2025

Related U.S. Application Data

(60) Provisional application No. 63/540,327, filed on Sep. 25, 2023.

(51) Int. Cl.
*H01Q 9/04* (2006.01)
*H01Q 23/00* (2006.01)

(52) U.S. Cl.
CPC ......... *H01Q 9/0414* (2013.01); *H01Q 9/0442* (2013.01); *H01Q 9/0485* (2013.01); *H01Q 23/00* (2013.01)

(58) Field of Classification Search
CPC .. H01Q 9/0414; H01Q 9/0442; H01Q 9/0485; H01Q 23/00; H01Q 1/523;
(Continued)

(56) References Cited

U.S. PATENT DOCUMENTS

| | | | | |
|---|---|---|---|---|
| 11,424,548 B2 * | 8/2022 | Achour | ................ | H01Q 21/005 |
| 2019/0103665 A1 * | 4/2019 | Yoo | ........................ | H01Q 1/364 |

(Continued)

FOREIGN PATENT DOCUMENTS

| | | |
|---|---|---|
| KR | 10-2021-0122956 A | 10/2021 |
| WO | 2022/122319 A1 | 6/2022 |

OTHER PUBLICATIONS

International Search Report and Written Opinion received for PCT Patent Application No. PCT/IB2024/059301, mailed on Jan. 13, 2025, 10 pages.

(Continued)

*Primary Examiner* — Seung H Lee

(74) *Attorney, Agent, or Firm* — Womble Bond Dickinson (US) LLP

(57) ABSTRACT

Backplane architectures for metasurface antennas and methods for driving amplifiers with the same are disclosed. In some embodiments, the metasurface antenna includes: a plurality of radio-frequency radiating antenna elements; a plurality of tuning elements coupled to the plurality of radio-frequency radiating antenna elements, wherein each tuning element of the plurality of tuning elements is associated with one antenna element of the plurality of antenna elements; a plurality of amplifiers coupled to the plurality of radio-frequency radiating antenna elements, wherein each amplifier of the plurality of amplifiers is associated with one antenna element of the plurality of antenna elements; and drive circuitry coupled to the plurality of antenna elements, the plurality of amplifiers and the plurality of tuning elements, configured to drive individually each of the plurality of antenna elements and the plurality of amplifiers.

28 Claims, 13 Drawing Sheets

(58) Field of Classification Search
CPC .. H01Q 21/064; H01Q 1/325; H01Q 15/0086; H01Q 21/065
See application file for complete search history.

(56) References Cited

U.S. PATENT DOCUMENTS

| | | | | |
|---|---|---|---|---|
| 2019/0372234 | A1 | 12/2019 | Lipworth et al. | |
| 2021/0210866 | A1 * | 7/2021 | Boyarsky | H01Q 13/28 |
| 2021/0313708 | A1 | 10/2021 | Lee et al. | |
| 2022/0278449 | A1 | 9/2022 | Sazegar et al. | |
| 2022/0399651 | A1 | 12/2022 | Sleasman et al. | |

OTHER PUBLICATIONS

International Preliminary Report on Patentability received for PCT Patent Application No. PCT/IB2024/059301, mailed on Apr. 2, 2026, 7 pages.

* cited by examiner

BACKPLANE FOR METASURFACE ANTENNA WITH AN AMPLIFIER DRIVEN BY DRIVE CIRCUITRY

RELATED APPLICATION

The present application is a non-provisional application of and claims the benefit of U.S. Provisional Patent Application No. 63/540,327, filed Sep. 25, 2023, and entitled "BACKPLANE FOR METASURFACE ANTENNA WITH MATRIX DRIVE DRIVEN AMPLIFIER", which is incorporated by reference in its entirety.

FIELD OF THE DISCLOSURE

Embodiments of the present disclosure are related to wireless communication; more particularly, embodiments disclosed herein related to a metasurface antenna such as can be incorporated into, for example, a satellite terminal, including an antenna with a backplane matrix drive architecture.

BACKGROUND

Metasurface antennas have recently emerged as another example of an electronically steerable antenna for generating steered, directive beams from a lightweight, low-cost, and planar physical platform. Such metasurface antennas have been recently used in a number of applications, such as, for example, satellite communication.

Metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

Passive metasurface antennas require a source of RF power on the transmit (Tx) side. In some prior art metasurface antennas, this source of RF power is a block upconverting amplifier (BUC). The BUC is a traditional satellite communications component that is very expensive, large/bulky, and suffers from a low volume supply chain. On the receive (Rx) side, the passive metasurface antenna suffers from having the low noise amplifier downstream of the antenna element losses and feed losses.

SUMMARY

Backplane architectures for metasurface antennas and methods for driving amplifiers with the same are disclosed. In some embodiments, the metasurface antenna includes: a plurality of radio-frequency radiating antenna elements; a plurality of tuning elements coupled to the plurality of radio-frequency radiating antenna elements, wherein each tuning element of the plurality of tuning elements is associated with one antenna element of the plurality of antenna elements; a plurality of amplifiers coupled to the plurality of radio-frequency radiating antenna elements, wherein each amplifier of the plurality of amplifiers is associated with one antenna element of the plurality of antenna elements; and drive circuitry coupled to the plurality of antenna elements, the plurality of amplifiers and the plurality of tuning elements, configured to drive individually each of the plurality of antenna elements and the plurality of amplifiers.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
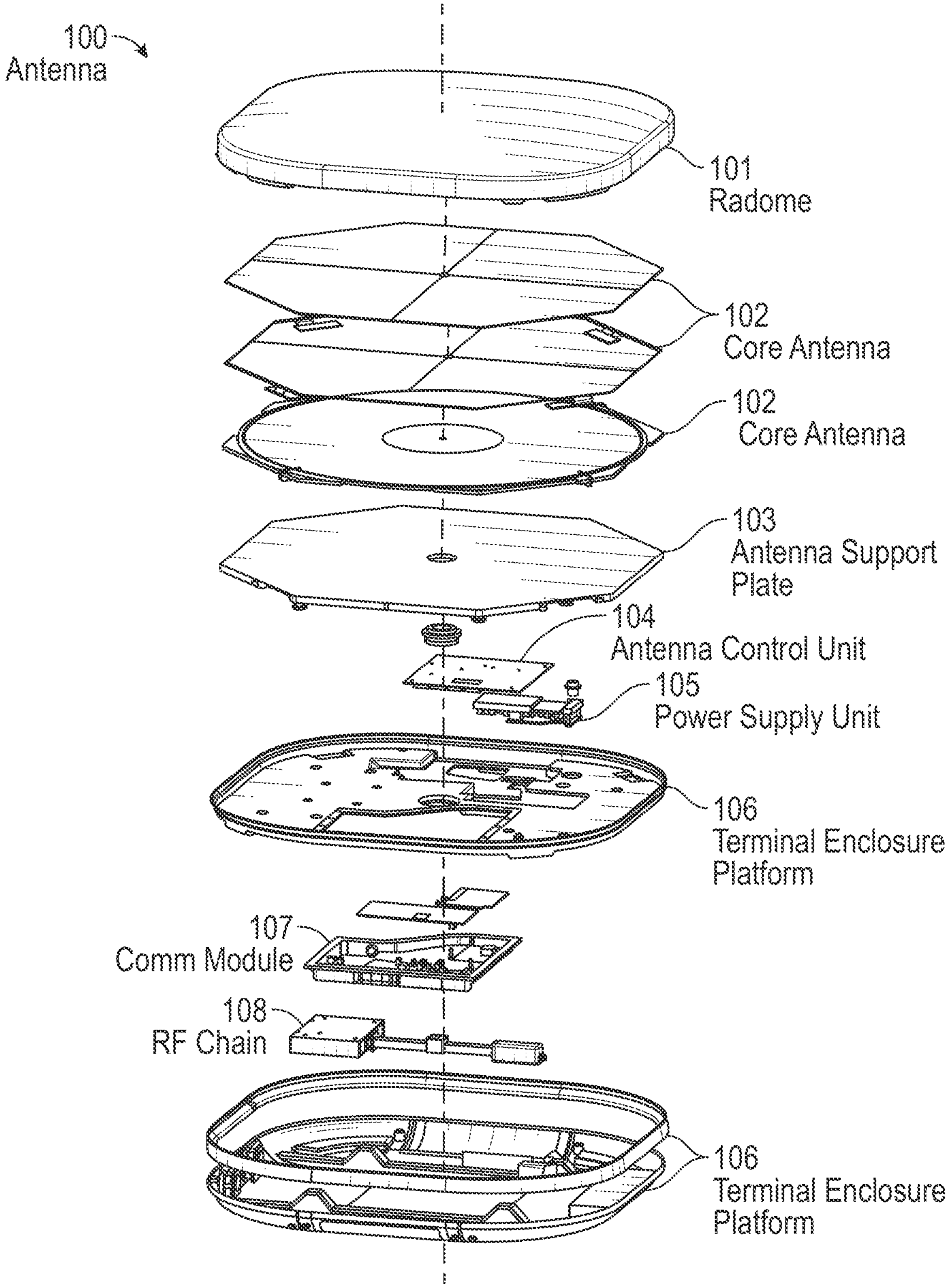
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the teachings disclosed herein may be practiced without these specific details. In other instances, well-known structures and devices are shown in block diagram form, rather than in detail, in order to avoid obscuring the present disclosure.

Metasurface antenna architectures with radio-frequency (RF) radiating antenna elements (e.g., resonators) are disclosed. In some embodiments, the metasurface antenna is a holographic metasurface antenna. Embodiments disclosed herein include active metasurface antennas that incorporate active gain elements (devices) into the receive (Rx) and transmit (Tx) antenna elements. In some embodiments, the RF gain elements comprise amplifiers for each RF radiating antenna element. In some embodiments, the metasurface antenna includes a backplane architecture with a matrix drive drives both the antenna elements and amplifiers at those antenna elements. Some embodiments disclosed herein also incorporate optimized devices, heterogeneously, that include a pixel (antenna element) driving circuit, a Rx amplifier, a Tx amplifier, and a tuning device (e.g., a varactor or other tuning element).

In contrast, existing diffractive metasurface antenna solutions are passive, and do not incorporate gain into the metasurface. Furthermore, passive metasurface antennas utilizing liquid crystal (LC) on glass substrates do not incorporate via structures. Both LC and varactor-based passive metasurface antennas utilize thin film deposited transistors for the active matrix backplane. It is very difficult to incorporate devices such as an amplifier, pixel (antenna element) driving circuit, and capacitive tuning element into the metasurface with current thin film deposition and chip-on-board fabrication techniques.

Some embodiments disclosed herein include via structures that implement more flexible RF and direct current (DC) routing schemes to interconnect the different devices. In some embodiments, the metasurface antenna has a glass substrate and incorporates via-in-glass, which provides more design flexibility for the metasurface.

The following disclosure discusses examples of antenna apparatus embodiments that can be part of terminals described herein, followed by details of metasurface antenna having a backplane architecture with a matrix drive in which amplifiers at the antenna elements are driven with the matrix drive.

Examples of Antenna Embodiments

The techniques described herein may be used with a variety of satellite antennas, for example, flat panel satellite antennas. Some embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Pat. No. 11,489,266, entitled "Metasurface Antennas Manufactured with Mass Transfer Technologies," issued Nov. 1, 2022. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, micro-electromechanical systems (MEMS) devices, pin diodes, or other tunable capacitance devices, could be placed into an antenna aperture or elsewhere in variations on the embodiments described herein.

Although embodiments in this disclosure may draw on some examples in communications, some embodiments could be implemented in various receiving, transmitting, and/or sensing or other similar applications. Some examples could include devices for radar, lidar, sensors and sensing device such as, but not limited to, those in autonomous vehicles applications, and any other applications that can take advantage of attributes of an active metasurface according to various disclosed and undisclosed embodiments of the present disclosure.

In some embodiments, the antenna aperture having the one or more arrays of antenna elements is comprised of multiple segments that are coupled together. In some embodiments, when coupled together, the combination of the segments form groups of antenna elements (e.g., closed rings of antenna elements concentric with respect to the antenna feed, etc.). For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Pat. No. 11,489,266, entitled "Metasurface Antennas Manufactured with Mass Transfer Technologies," issued Nov. 1, 2022. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor (s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QOS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
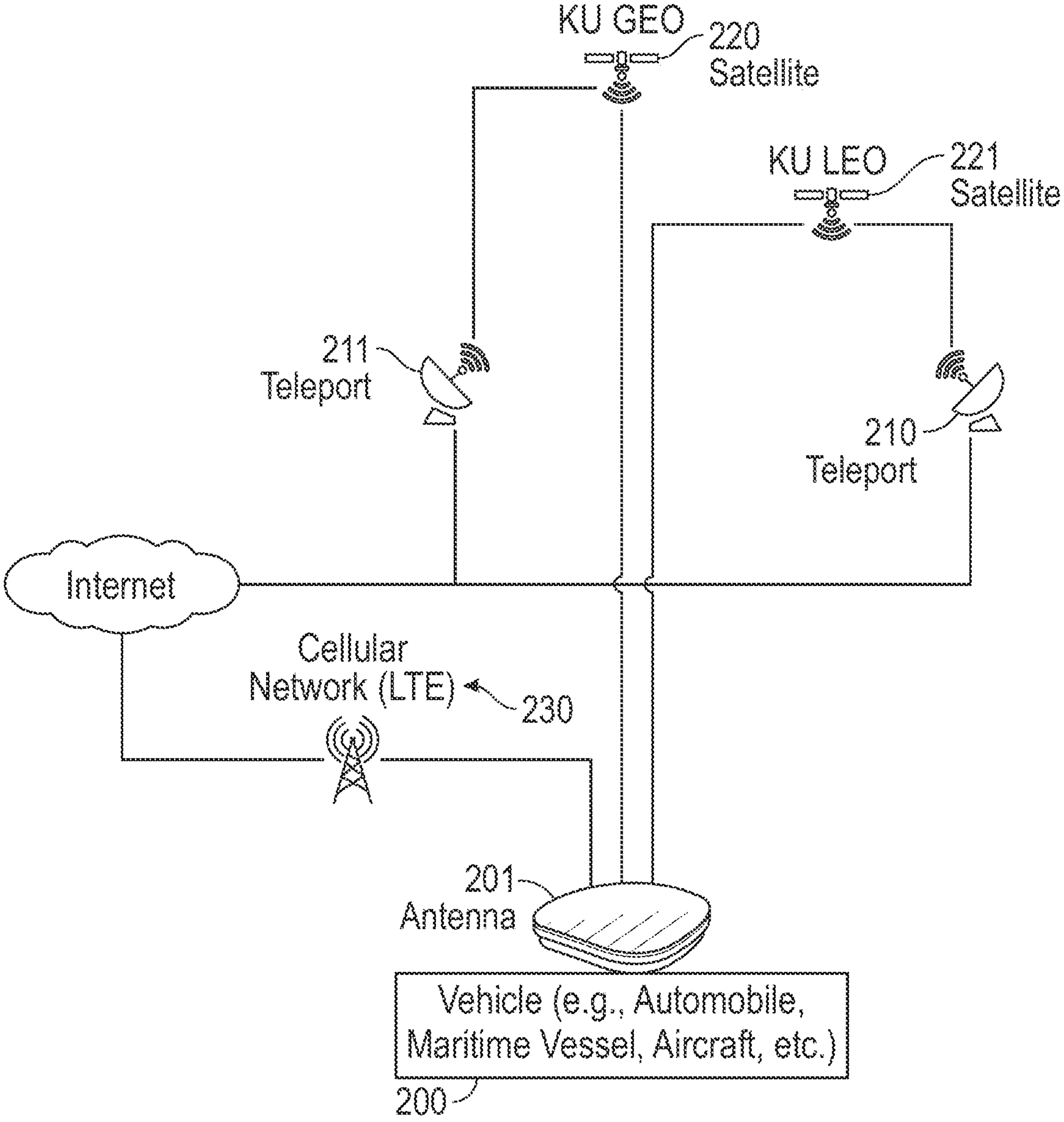
FIG. 2 illustrates an example of a communication system that includes one or more antennas according to some embodiments.

FIG. 2 illustrates an example of a communication system that includes one or more antennas described herein. Referring to FIG. 2, vehicle 200 includes an antenna 201. In some embodiments, antenna 201 comprises antenna 100 of FIG. 1. In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. Pat. No. 11,818,606, entitled "Multiple Aspects of Communication in a Diverse Communication Network", and issued Nov. 14, 2023. Communication between a network, such as for example, the Internet and satellites 220 and 221 can be via teleports 211 and 210, respectively.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communication with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. After establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections. In some embodiments, antenna 201 comprises a metasurface RF antenna having multiple RF radiating antenna elements that are tuned to desired frequencies using RF antenna element drive circuitry. The drive circuitry can include a drive transistor (e.g., a thin film transistor (TFT) (e.g., CMOS, NMOS, etc.), low or high temperature polysilicon transistor, memristor, etc.), a Microelectromechanical systems (MEMS) circuit, or other circuit for driving a voltage to an RF radiating antenna element. In some embodiments, the drive circuitry comprises an active-matrix drive. In some embodiments, the frequency of each antenna element is controlled by an applied voltage. In some embodiments, this applied voltage is also stored in each antenna element (pixel circuit) until the next voltage writing cycle.

Metasurface Antenna with Backplane Architecture

In some embodiments, a metasurface antenna incorporates one or more of the following: via-in-glass (substrate), active radio-frequency (RF) gain elements (e.g., amplifiers, etc.), and heterogeneously integrated devices into the metasurface. In some embodiments, the metasurface antenna is an active holographic metasurface antenna.

In some embodiments, the metasurface antenna includes an amplifier at the RF radiating antenna element as a gain element. In some embodiments, the addition of a gain element into the RF tuning device controls the scattering from each antenna element. In some embodiments, the amplifiers in the metasurface amplify the signal from the input amplifier and provide the output power to achieve the required EIRP. Improved power added efficiency (PAE) can be obtained by putting the amplification stage into the metasurface. In some embodiments, separately controllable gain elements are incorporated and this also allows for independent control of amplitude and phase in the holographic beamforming algorithm (see, for example, U.S. Pat. Nos. 10,686,636, and 11,018,912 for more information on holographic beamforming with amplitude and phase control). In some embodiments, the amplifier is a low-noise amplifier. In some other embodiments, the amplifier is a power amplifier. In still some other embodiments, the amplifier can function as both at different times.

In some embodiments, the amplifier at the antenna element is driven with a signal from a matrix drive, as is described in greater detail below. In some embodiments, the matrix drive is coupled to the RF radiating antenna elements, amplifiers and tuning elements, and is configured to drive each antenna elements and their corresponding amplifiers (at the antenna element) individually. In some embodiments, the matrix driver circuitry includes driver circuits in a row and column topology, where each driver circuit outputs a pair of signals simultaneously to an antenna element and its associated amplifier. The pair of signals includes a first tuning signal to tune the one antenna element and a second amplifier signal to tune the associated amplifier.

In some embodiments, in the active metasurface antenna concept, placing the low noise amplifier at the antenna element can improve G/T by >1 dB. In some embodiments, the active metasurface antenna permits a much smaller/cheaper RF power source on the back side of the antenna that can be potentially implemented in one RF application specific integrated circuit (ASIC) that also incorporates the low noise amplifier and the digital functionality typically residing in the antenna control unit (ACU) as well. In some embodiments, in the active metasurface antenna, a much smaller/cheaper amplifier can be used on the back of the antenna.

In some embodiments, the active metasurface concept implements a low noise amplifier integrated with the varactor (or other type of) tuning element, thereby increasing the gain/noise temperature ratio of the antenna. In some embodiments, heterogeneous integration techniques are used to implement separately improved, and potentially optimized, devices for DC pixel (antenna element) control, RF gain, and RF tuning.

Heterogeneous integration solves a problem of being constrained by one semiconductor process or materials system. In some embodiments, optimized devices for the DC pixel driver circuit, RF amplifiers (Tx power amplifier and Rx low noise amplifier), and varactor tuning device can be implemented on one substrate and can then be integrated onto the metasurface. In some embodiments, heterogeneous integration techniques are used, and devices from different materials systems and semiconductor processes can be incorporated into the metasurface to achieve maximum performance. For example, in one integration, the following components are integrated together:

1. High-voltage 180 nm silicon process for the active matrix backplane pixel driver,
2. 22 nm RF silicon process for the amplifiers, and
3. GaAs varactor diode.

One or more embodiments disclosed herein have one or more advantages, including, but not limited to: improved Rx antenna gain/noise temperature performance, lower bill of materials (BOM) cost, lower power consumption, more highly integrated terminal design, and smaller height profile.

Metasurface Antenna with Vias-in-Glass

In some embodiments, the metasurface antenna has a glass substrate and thru vias extend through the glass substrate (vias-in glass) in order to electrically connect one or more components or features that are on opposite sides of the glass substrate. For example, in some embodiments, an iris metal layer is attached, directly or indirectly, to the bottom side of the glass substrate and is connected to components (e.g., varactor or other tuning element, a radiating patch or other radiating antenna, etc.) connected or coupled to the top of the glass substrate using one or more vias. In some embodiments, the vias are plated vias that are plated with an electrically conductive material (e.g., metal).

The use of the vias enables components that would otherwise have to be attached to the iris metal layer on the same side of the glass structure as the iris metal layer to be removed from the same side of the glass structure as the iris metal layer. If the metal layer and one or more components coupled together are on the same side of the glass substrate, it is difficult to put another layer directly against the iris metal layer; however, by using vias-in-glass, the iris layer can be on top of another layer, such as, for example, the feed upper dielectric layer that is part of the feed that supplies a feed wave to the RF radiating antenna elements of the metasurface.

In some embodiments, the glass substrate of the metasurface is coupled to RF radiating antenna elements and tuning elements for the antenna elements are coupled to one side of the glass substrate while an iris metal layer is attached or connected to the opposite side of the glass substrate opposite the first side and forms the iris layer with irises of the antenna elements. Each of the tuning elements is electrically connected to the iris metal layer using a via through the glass substrate. This allows an upper feed dielectric to be connected or attached to iris metal layer.

For purposes herein, where layers being connected or attached are described, it is understood that being positioned adjacent or being coupled or other positioning attributes are contemplated to be in the scope of this disclosure. Similarly, electrically connected disclosures with respect to certain components include embodiments in which such components are in electronic or electrical communication.

Figure 3:
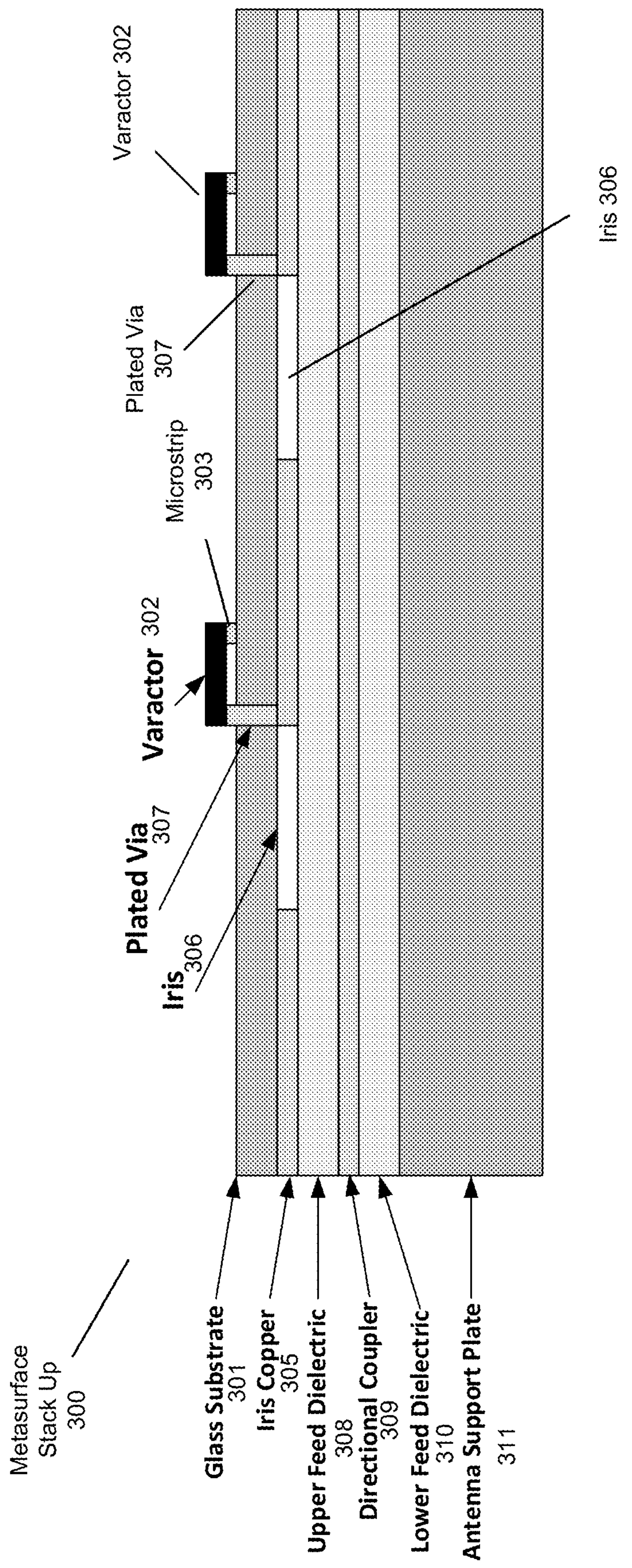
FIG. 3 illustrates some embodiments of a metasurface stack up.

FIG. 3 illustrates some embodiments of a metasurface stack up. Referring to FIG. 3, metasurface stack up 300 includes a glass substrate 301 and a varactor 302 (or other tuning elements) attached to glass substrate 301 via microstrips 303. Varactor 302 behaves as a tunable capacitor in parallel with the slot. Attached to the bottom of glass substrate 301 is iris metal (e.g., copper) layer 305. Iris metal layer 305 forms irises 306. Varactor 302 is coupled and electrically connected to iris metal layer 305 using one or more vias 307 through glass substrate 301. In some embodiments, via 307 is a plated via.

In some embodiments, an upper feed dielectric layer 308 is included in metasurface stack up 300 and has a top and bottom surface. The top surface of upper feed dielectric layer 308 is connected or otherwise attached to iris metal layer 305, while the bottom surface of upper feed dielectric layer 308 is on top of and connected to a directional coupler 309. The bottom surface of directional coupler 309 is on top of and connected to a lower feed dielectric layer 310, which is attached to and sits on top of antenna support plate 311. In some embodiments, upper feed dielectric layer 308, directional coupler 309 and lower feed dielectric layer 310 operate to propagate a feed wave to the antenna elements of the metasurface antenna. Note that these layers in metasurface stack up 300 can have one or more layers in between each other.

Because iris metal layer 305 can be up against the upper feed dielectric layer, larger iris designs can be implemented for increased radiation efficiency. That is, in FIG. 3, with the copper layer against the upper dielectric layer, the glass layer is no longer part of the upper feed dielectric stack. The feed wave is uniformly distributed in the upper dielectric, thereby allowing the iris to be larger. In contrast, in the other case, with the glass substrate in contact with the upper feed dielectric layer, the feed wave ends up being concentrated in the glass layer due to the higher dielectric constant, which forces a smaller iris size for a given coupling rate between the iris and the feed wave.

Note that the layers shown in the embodiments illustrated in FIG. 3, as well as other figures included herein, can be coupled together or attached using several different materials, including, for example, glue or other adhesives (e.g., pressure-sensitive adhesive (PSA), etc.), or other suitable features for securing, positioning, and/or coupling.

Decoupling Vias

In some embodiments, vias are incorporated into the metasurface to decouple adjacent irises from one another. That is, vias are included to reduce mutual coupling that might occur between irises that are in an iris layer in the metasurface. For example, each RF radiating antenna element includes an iris and can have a tuning element across the iris. In such an arrangement, a number of vias can be deployed around portions of the iris to decouple the iris from one or more adjacent irises. In some embodiments, the deployment of vias is around a portion of the perimeter of an iris (e.g., around one or more ends, by one or more sides, etc.). For example, in some embodiments, the vias include a first set of vias around a first end of the iris and a second set of vias around a second end of the iris. In some other embodiments, the deployment of vias is in the form of a via wall between adjacent irises.

The number of vias to be deployed can be based on the amount of decoupling desired. In some embodiments, three vias are deployed around a portion of an iris or as part of a via wall to provide decoupling between two adjacent irises. Alternatively, other numbers of vias can be used (e.g., 2, 4, 5, 6, etc.) for decoupling between adjacent irises.

In some embodiments, the via can be a simple plated through-hole or a via with a patch element on top, implementing a "mushroom" structure. An advantage of the mushroom structure is that it provides additional design freedom to tune capacitance of the via structure as well as inductance. In some embodiments, the via extend from the bottom to the top of the metasurface stack to provide a grounded conducting wall. In some embodiments, that distance tends to be on the order of 0.020" but it can vary based on the design.

Figure 4A:
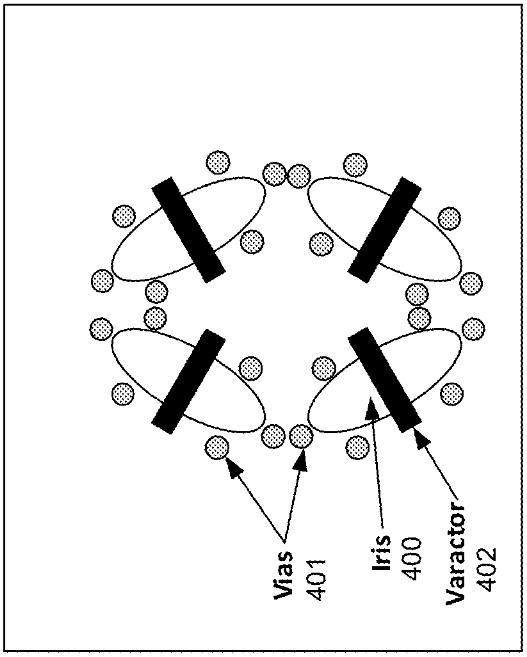
FIGS. 4A-4C illustrate examples a top view of a portion of a metasurface that includes the use of decoupling vias.
Figure 4B:
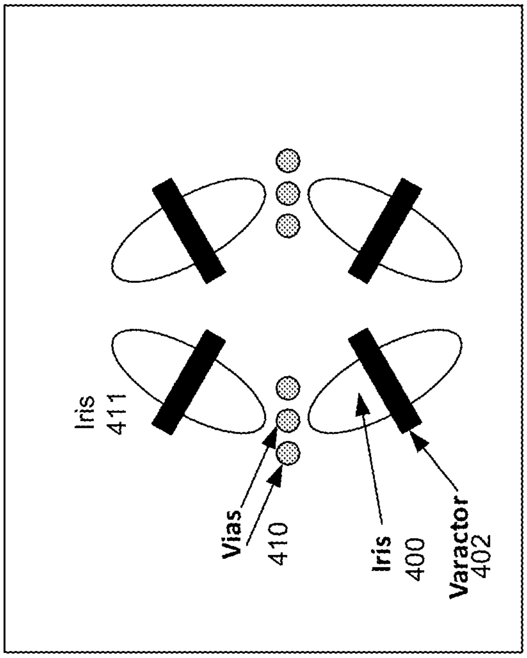
Figure 4C:
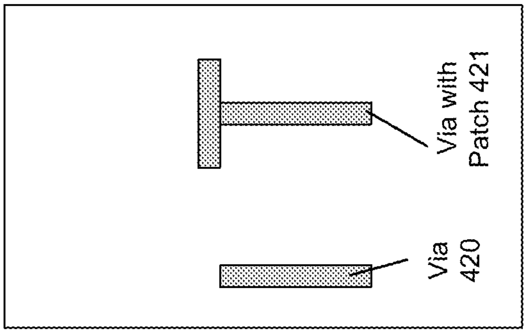

FIGS. 4A-4C illustrate examples of a top view of a portion of a metasurface that includes the use of decoupling vias. Referring to FIG. 4A, a number of irises 400 are shown, each with a varactor (or other tuning elements) 402 coupled across a central portion of iris 400. In some embodiments, the vias extend as shown in from the top of the substrate to the copper layer on the bottom of the substrate. Note that in some other embodiments, varactor (tuning element) 402 can be coupled across other portions of the iris (e.g., coupled across a location closer to the ends of iris 400). Around the ends of irises 400 are sets of vias 401. For example, around each end of iris 400 are three vias. Note that in some other embodiments, more or less than three vias can be used around the ends of iris 400 (for a total of 6 vias for each iris having adjacent irises). Vias 401 provide for decoupling between adjacent irises that are adjacent to iris 400.

FIG. 4B illustrates some other embodiments of a portion of a metasurface that includes decoupling vias between adjacent irises. Referring to FIG. 4B, iris 400 is adjacent to iris 411. Vias 410 form a via wall between irises 400 and 411. In some embodiments, vias 410 form a via wall using three vias. However, the techniques disclosed herein are not limited to using three vias and may use more or less than three vias to obtain the decoupling between adjacent irises 400 and 411. In some embodiments, the spacing between via is A/40.

FIG. 4C illustrates two examples of vias that may be used for decoupling between adjacent irises. Referring to FIG. 4C, via 420 resembles a simple via that appears as a post, while via 421 illustrates a via with a patch on top which appears as a mushroom structure. In some embodiments, the patch is a flat patch.

Note that the vias are typically constructed from a metal such as, for example, copper or aluminum; however, other conductive materials can be used.

Active Metasurface with Integrated RC Circuit Elements

In some embodiments, the metasurface antenna includes integrated circuit elements that include resistors and capacitors. For example, in some embodiments, the metasurface antenna includes integrated RC circuit elements having a tuning element and an amplifier. In some embodiments, the tuning element comprises a varactor.

In some embodiments, the metasurface includes a substrate (e.g., glass, printed circuit board (PCB), etc.) coupled to each RF radiating antenna elements, or portion thereof. At least one of these antenna elements includes a radiating element (e.g., a radiating patch, etc.) coupled to one side of the substrate, with an integrated circuit having a tuning element and amplifier circuit coupled to the radiating element. An iris layer having iris metal with irises formed therein is on the opposite side of the substrate from the side with the radiating element and the integrated circuit. In some embodiments, a feed stack for providing a feed wave to the metasurface and its antenna elements is connected to the iris layer (e.g., the iris metal layer).

Figure 5:
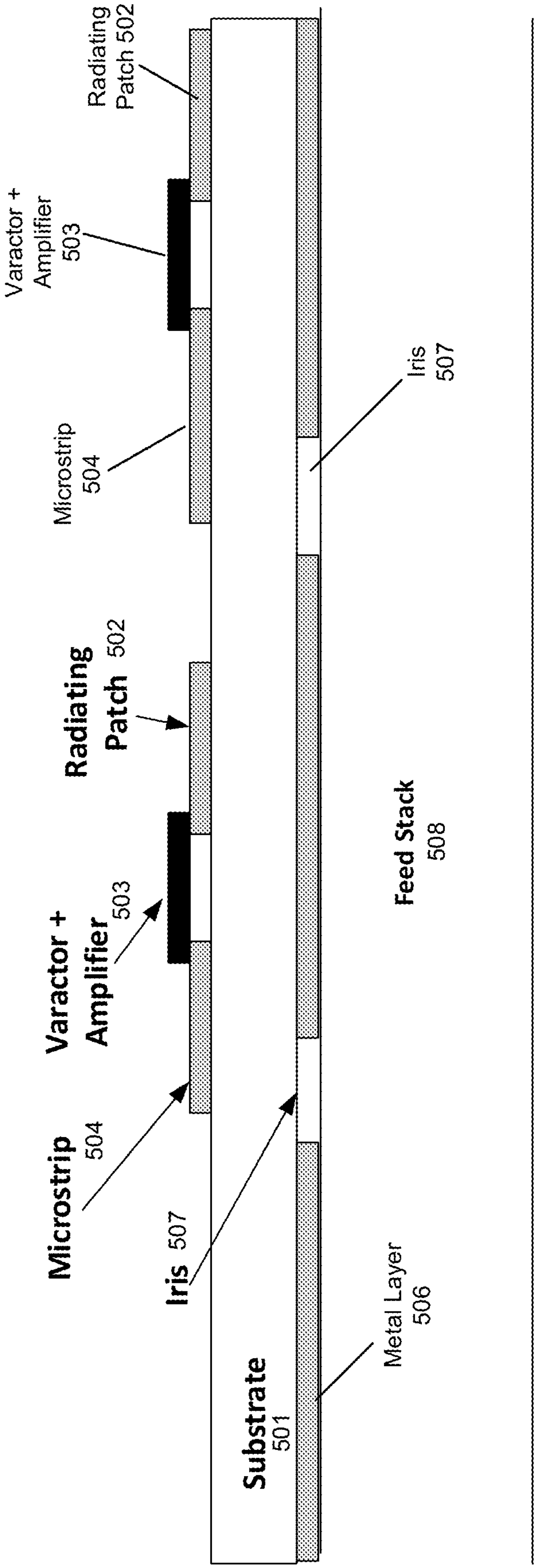
FIG. 5 illustrates some embodiments of an active metasurface having integrated RC circuit elements.

FIG. 5 illustrates some embodiments of an active metasurface having integrated RC circuit elements. Referring to FIG. 5, radiating patch 502 is coupled to, or otherwise attached to, the top surface of substrate 501. An integrated circuit 503 that includes a varactor and an amplifier is coupled to radiating patch 502. In some embodiments, the amplifier is an LNA on the Rx subarray and a PA on the Tx subarray. The amplifiers could be made using, for example, but not limited to, RF complementary metal-oxide-semiconductor (CMOS), silicon germanium (SiGe) Bipolar CMOS (BiCMOS), RF silicon on insulator (SOI), gallium arsenide (GaAs), etc. In some embodiments, integrated circuit 503 is also coupled to substrate 501 via microstrip 504 (or other transmission line). An iris metal layer 506 is coupled to the bottom side of substrate 501 and forms irises 507. Radiating patch 502 in conjunction with the irises 507 are part of an RF radiating antenna element. Iris metal layer 506 can comprise copper, aluminum, or other suitable metal. Iris metal layer 506 sits on top of and is attached to a feed stack 508 that is responsible for providing a feed wave to the metasurface and its antenna elements.

In some embodiments, in this design, the iris metal layer is on or towards the lower side of the substrate and sits against the feed stack. The iris 507 couples RF energy to microstrip 504, which in turn routes the RF signal through the varactor and amplifier of integrated circuit 503 to a radiating element. While the radiating element is shown as a patch antenna element 502, other radiating elements can be used. In some embodiments, the varactor and amplifier of integrated circuit 503 are controlled by a pixel driver circuit implemented on the backplane substrate, as described in more detail herein. The pixel driver circuit drives one or more RF radiating antenna elements. In some embodiments, the pixel driver circuit provides signals for tuning an antenna (via a tuning element) and driving an amplifier. In some embodiments, the pixel driver circuit is a thin film transistor pixel driver circuit. In some embodiments, the varactor and amplifier are implemented in a single IC chip in the same materials system, for example, in gallium arsenide (GaAs).

In some other embodiments, the pixel (antenna element) driver circuit is implemented as a heterogeneously integrated "chiplet" incorporating a high-voltage silicon direct current (DC) pixel driver, RF amplifier, and a varactor. In some embodiments, the RF amplifier is implemented in RF silicon, gallium nitride, gallium arsenide, or other alternatives, and the varactor is implemented in gallium arsenide, silicon micro-electromechanical systems (MEMS), etc.). In some embodiments, the chiplet is flip-chip bonded to the metasurface substrate. In some embodiments, this metasurface embodiment requires double-sided processing of the metasurface substrate to form the iris features on one side of the substrate and microstrip and other routing features on the other (opposite) side of the substrate.

Figure 6A:
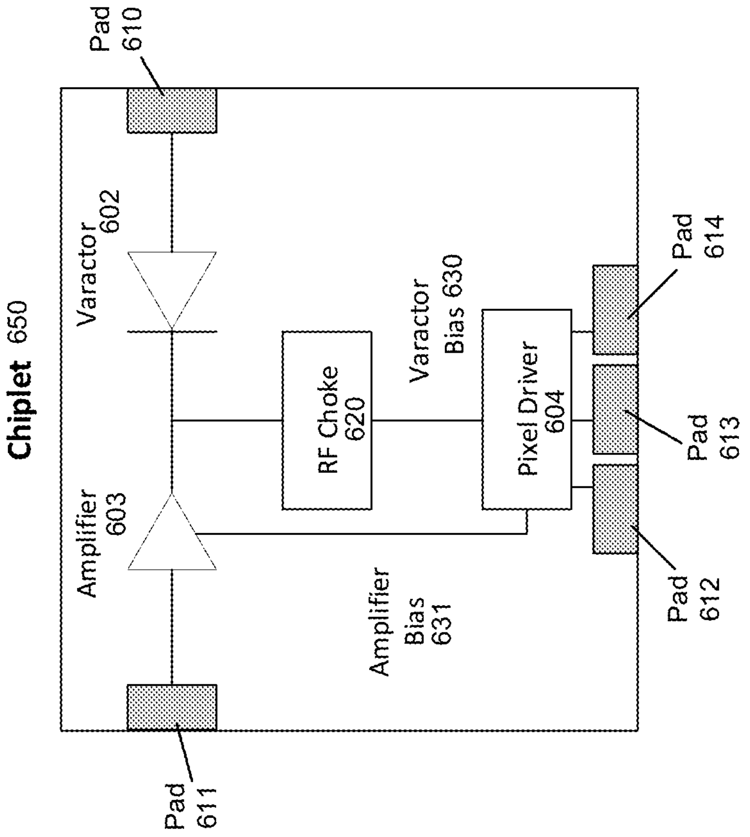
FIG. 6A illustrates some embodiments of a chiplet that includes a direct current (DC) pixel driver, RF amplifier, and a varactor.

FIG. 6A illustrates some embodiments of a chiplet that includes a direct current (DC) pixel driver, RF amplifier, and a varactor. Referring to FIG. 6A, chiplet 650 includes the varactor 602 having an output coupled to the output of an amplifier 603. Varactor 602 tunes the antenna element to which it is coupled. The inputs of varactor 602 and amplifier 603 are coupled to pads 610 and 611, respectively. Pad 611 provides RF signal to be amplified.

Varactor 602 is controlled by varactor bias 630 (voltage) that is generated by pixel driver 604. In some embodiments, chiplet 650 includes an RF choke 620 that allows passage of DC signals while blocking the RF signals from pixel driver 604. Amplifier 603 is controlled by amplifier bias 631 that is generated by pixel driver 604. Pixel driver 604 is coupled to pads 612-614. In some embodiments, pads 612-614 provide the voltage signal (e.g. DDD), a ground signal (e.g., GND), and an enable input to enable pixel driver 604 to drive the antenna element and amplifier 603 by outputting varactor bias 630 and amplifier bias 631.

Figure 6B:
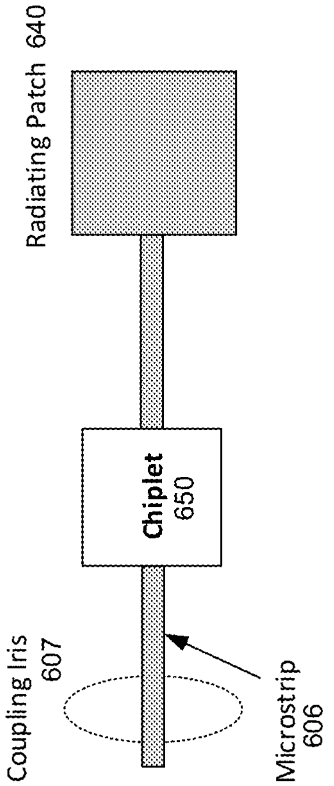
FIG. 6B illustrates some embodiments of an arrangement of an RF radiating element.

FIG. 6B illustrates some embodiments of an arrangement of an RF radiating element, such as radiating patch 640, being controlled by chiplet 650. Referring to FIG. 6B, chiplet 650 is coupled to radiating patch 640 and microstrip 606, which extends over at least a portion of coupling iris 607.

Figure 7:
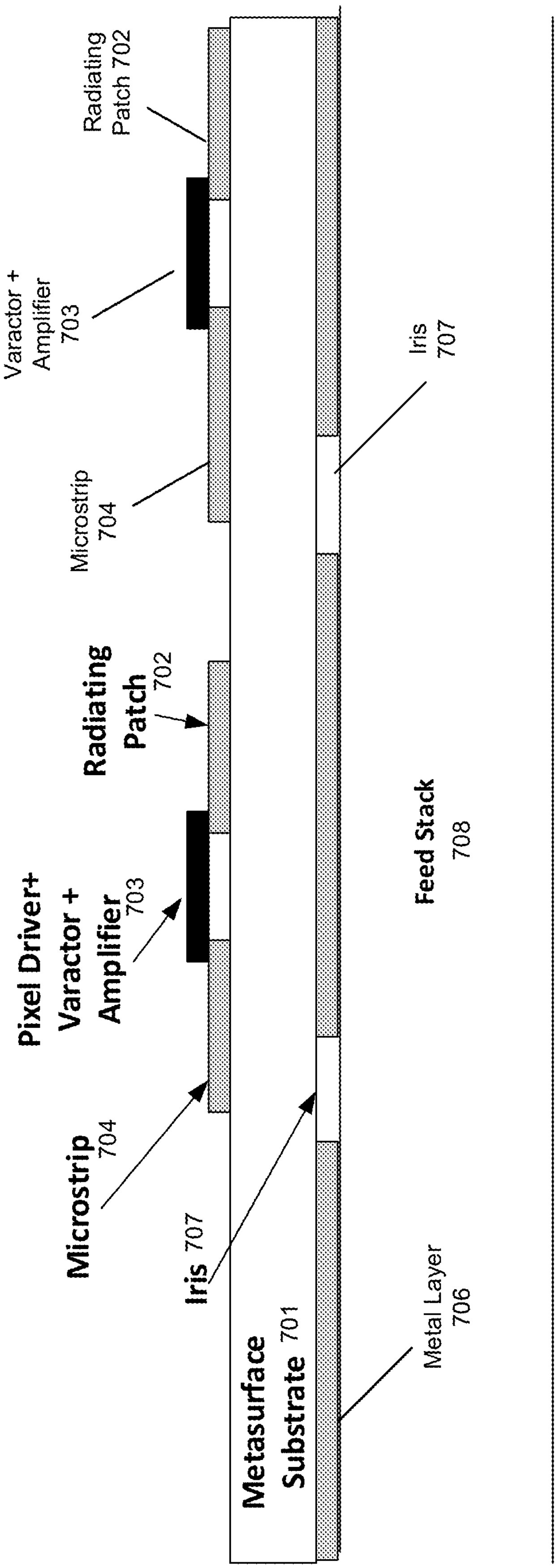
FIG. 7 illustrates some other embodiments of an active metasurface that utilizes a chiplet such as described in FIGS. 6A and 6B and integrated RC circuit elements.

FIG. 7 illustrates some other embodiments of an active metasurface that utilizes a chiplet such as described in FIGS. 6A and 6B and integrated RC circuit elements. Referring to FIG. 7, radiating patch (element) 702 is attached to the top of substrate 701. A chiplet (integrated circuit) 703 that includes a pixel driver circuit, a varactor and an amplifier is coupled to radiating patch 702. Chiplet 703 is also coupled to substrate 701 via microstrip 704 (or other transmission line). An iris metal layer 706 is coupled to the bottom side of substrate 701 and forms irises 707. Iris metal layer 706 sits on top of and is attached, or otherwise coupled, to a feed stack 708 that is responsible for propagating a feed wave to the metasurface and its antenna elements.

In some embodiments, the chiplet is placed on a glass or similar carrier substrate. This embodiment avoids double-sided processing of the metasurface substrate, such as shown, for example, in FIG. 7.

Figure 8:
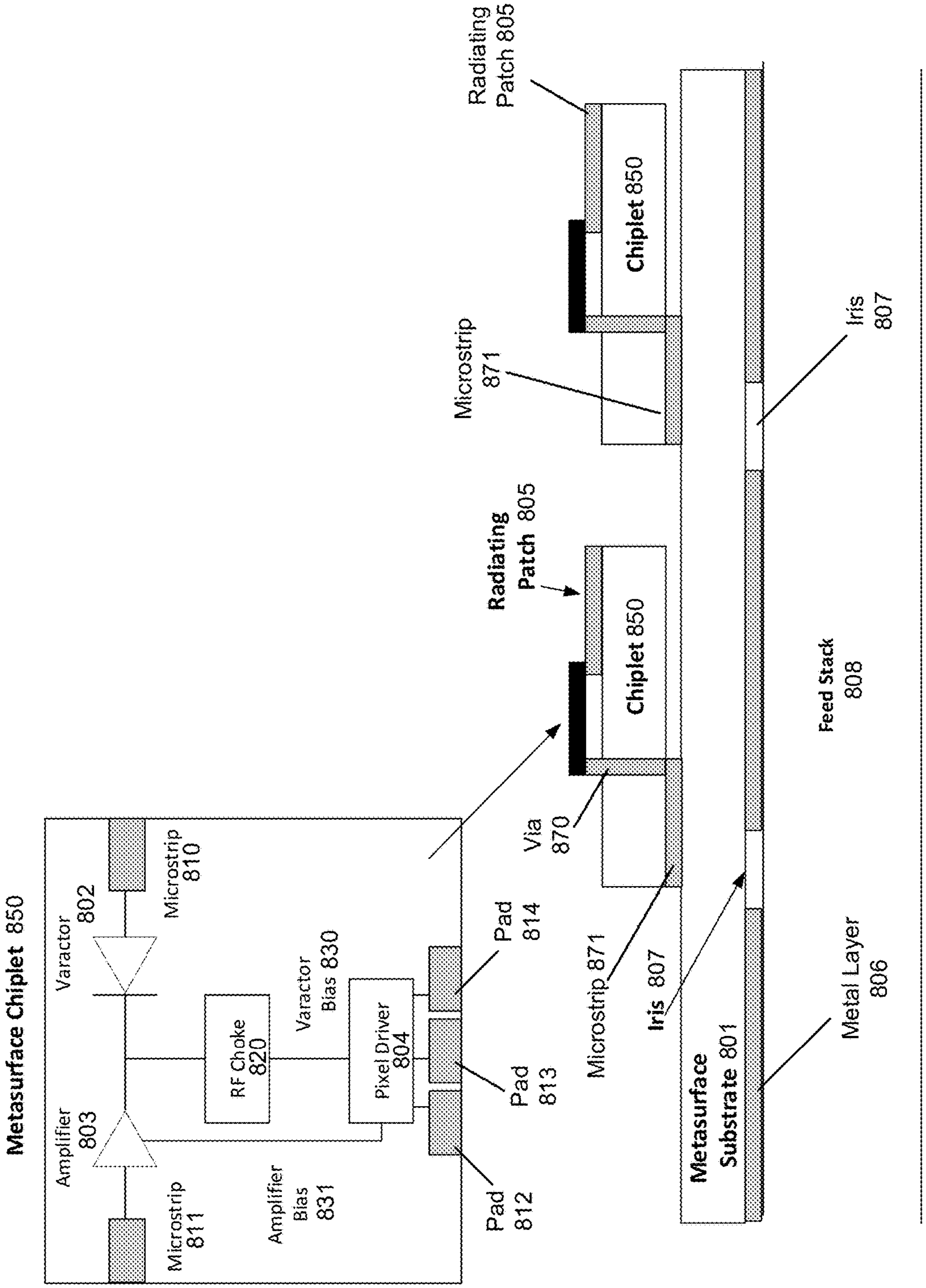
FIG. 8 illustrates some embodiments of a metasurface in which the chiplet is placed on a glass or similar metasurface substrate.

FIG. 8 illustrates some embodiments of a metasurface in which the chiplet is placed on a glass or similar metasurface substrate. Referring to FIG. 8, chiplet 850 includes the varactor 802 having an output coupled to the output of an amplifier 803. Varactor 802 tunes the antenna element to which it is coupled. The inputs of varactor 802 and amplifier 803 are coupled to microstrips 810 and 811, respectively. Microstrip 811 provides RF signal to be amplified.

Varactor 802 is controlled by varactor bias 830 (voltage) that is generated by pixel driver 804. In some embodiments, chiplet 850 includes an RF choke 820 that allows passage of DC signals while blocking the RF signals from pixel driver 804. Amplifier 803 is controlled by amplifier bias 831 that is generated by pixel driver 804. Pixel driver 804 is coupled to pads 812-814. In some embodiments, pads 812-814 provide the voltage signal (e.g. DDD), a ground signal (e.g., GND), and an enable input to enable pixel driver 804 to drive the antenna element and amplifier 803 by outputting varactor bias 830 and amplifier bias 831.

Metasurface substrate 801 (e.g., a glass substrate, a PCB, etc.) is coupled to chiplet 850 via microstrips 871. Chiplet 850 (including the solid black box) is also coupled to radiating patch 805 which is operating as an antenna element in conjunction with iris 807. Irises 807 are formed on the bottom side of metasurface substrate 801 using iris metal layer 806 (on feed stack 808). Iris 807 couples RF energy to microstrip line 871, which in turn routes the RF signal through the varactor and amplifier of chiplet 850 (using via 870) to radiating patch 805. While the radiating element is shown as a radiating patch antenna element 805, other radiating elements can be used. In some embodiments, the varactor and amplifier of chiplet 850 are controlled by a pixel driver circuit implemented on the backplane substrate, as described in more detail herein.

An Active Metasurface with Separated RF Circuit Elements

In some embodiments, the varactor (tuning element component) is separate from the amplifier component. This design provides one or more advantages that include freedom to optimize the amplifier design separately from the varactor component. In some embodiments, an example of which is shown in FIG. 9, the coupling iris is controlled by the attached varactor tuning device, and the feed wave energy is variably coupled from the iris to the microstrip line, mediated by the varactor element.

Figure 9:
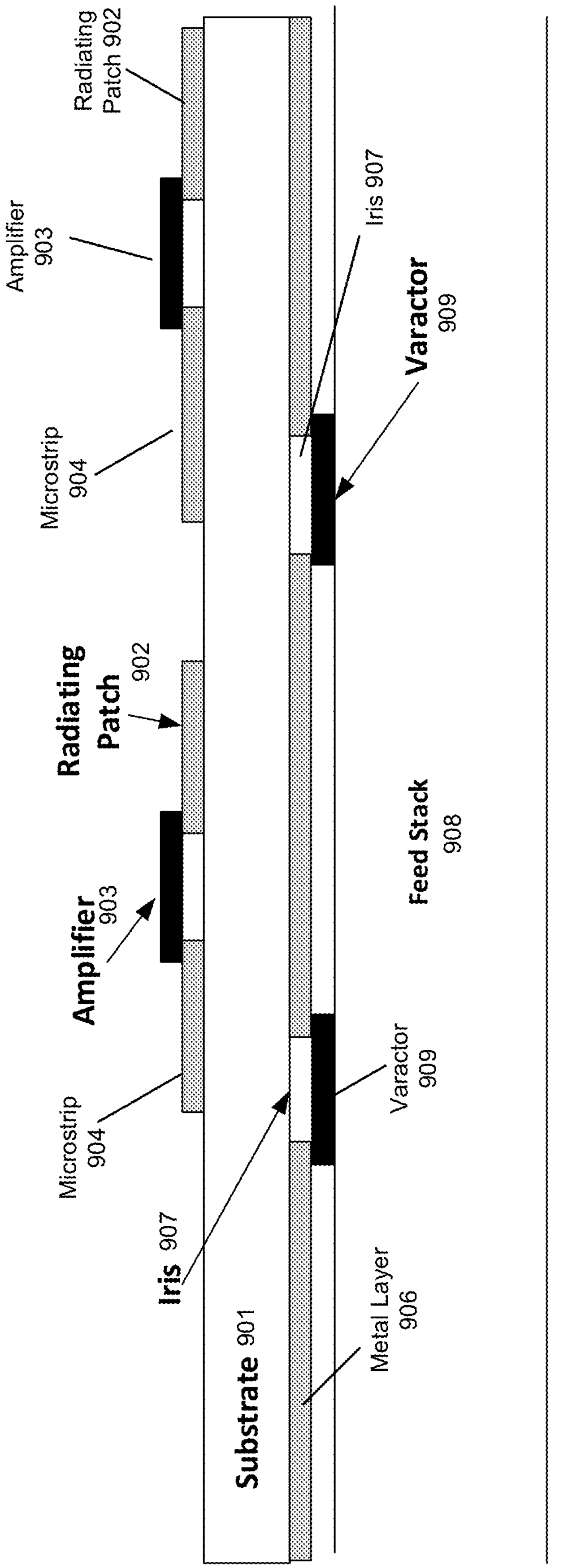
FIG. 9 illustrates an example of an active metasurface in which RC circuit elements are separated and not integrated into the same integrated circuit.

FIG. 9 illustrates an example of an active metasurface in which RC circuit elements are separated and not integrated into the same integrated circuit. In some embodiments, the RF circuit elements are the amplifier and the varactor (tuning element). Referring to FIG. 9, radiating patch 902 is attached, or otherwise coupled, to the top surface of substrate 901. An amplifier 903 is coupled to radiating patch 902. Amplifier 903 is also coupled to substrate 901 via microstrip 904 (or other transmission line). An iris metal layer 906 is attached, or otherwise coupled, to the bottom surface of substrate 901 and forms irises 907. Iris metal layer 906 sits on top of and is attached to a feed stack 908 that is responsible for propagating a feed wave to the metasurface and its RF radiating antenna elements. Varactor 909 is coupled across iris 907 for tuning the antenna element.

Figure 10:
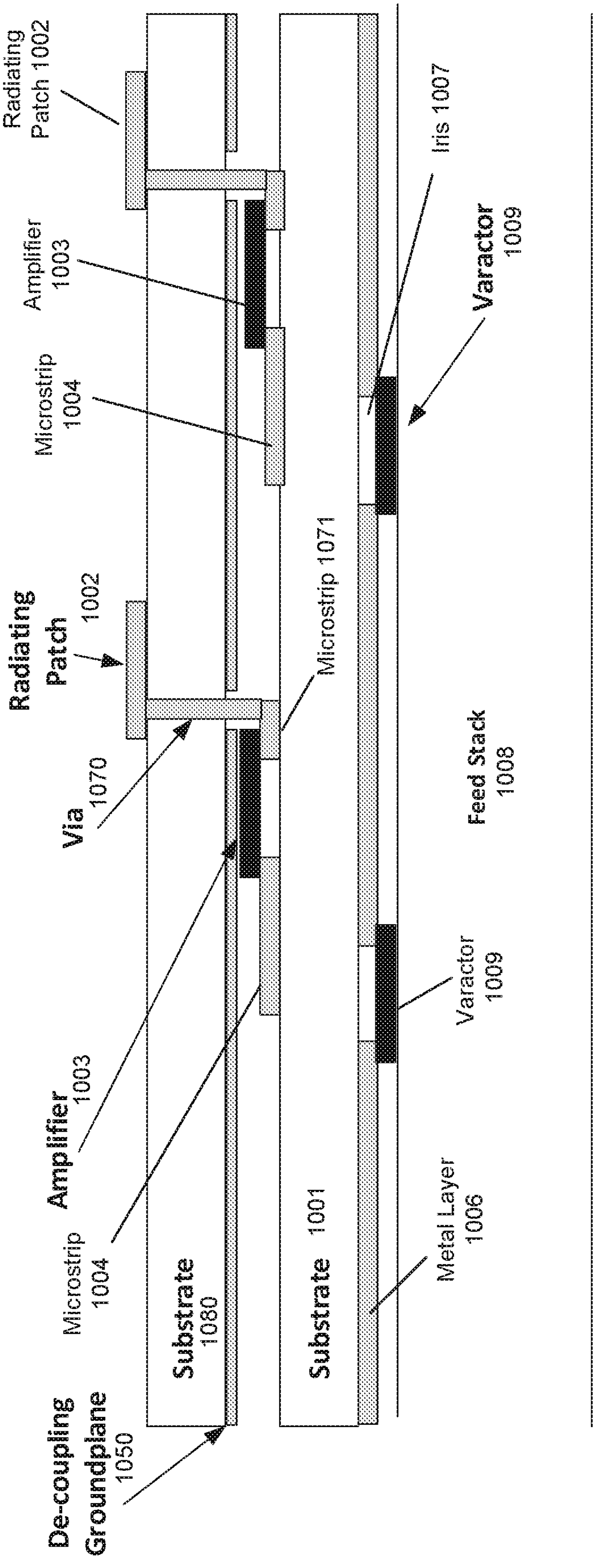
FIG. 10 illustrates some other embodiments of an active metasurface having separated RC circuits for the amplifier and the tuning element.

In some embodiments, an example of which is shown in FIG. 10, the metasurface is implemented using two substrates with a de-coupling ground plane implemented between the two substrates. The de-coupling ground plane provides additional isolation to reduce, and potentially eliminate, feedback paths to the amplifier.

FIG. 10 illustrates some other embodiments of an active metasurface having separated RC circuits for the amplifier and the tuning element (e.g., varactor, etc.). In the metasurface, two substrates are utilized. Referring to FIG. 10, radiating patch 1002 is attached to the top surface of substrate 1001. Radiating patch 1002 is also coupled via 1070 to and in microstrip 1071 to the amplifier 1003. Radiating patch 1002 is attached, or otherwise coupled, to substrate 1080 and via 1070 proceeds through substrate 1080. On the bottom surface of substrate 1080 is a decoupling ground plane 1050. In some embodiments, there is a gap between amplifier 1003 and decoupling ground plane 1050. The gap prevents electrically shorting the amplifier. The size of the gap is large enough to electrically isolate amplifier 1003 from decoupling ground plane 1050. In some embodiments, the gap is on the order of 2 mils to 4 mils.

Amplifier 1003 is also coupled to substrate 1001 via microstrip 1004 (or other transmission line). An iris metal layer 1006 is coupled to the bottom side of substrate 1001 and forms irises 1007. Iris metal layer 1006 sits on top of and is attached, or otherwise coupled, to a feed stack 1008 that is responsible for propagating a feed wave to the metasurface and its RF radiating antenna elements. Varactor 1009 is coupled across iris 1007 for tuning the antenna element.

Backplane Architecture

In some embodiments, the backplane includes a driver circuit to drive the antenna element and its associated amplifier. In some embodiments, the driver circuit comprises an integrated circuit (IC). In some embodiments, to drive all the antenna elements in the metasurface antenna, the backplane includes several such driver circuits (or driver ICs). In some embodiments, the driver circuits are controlled to drive the amplifiers using a matrix drive with row and column topology. An example of an arrangement of driver circuits in such a topology is described below.

Figure 11:
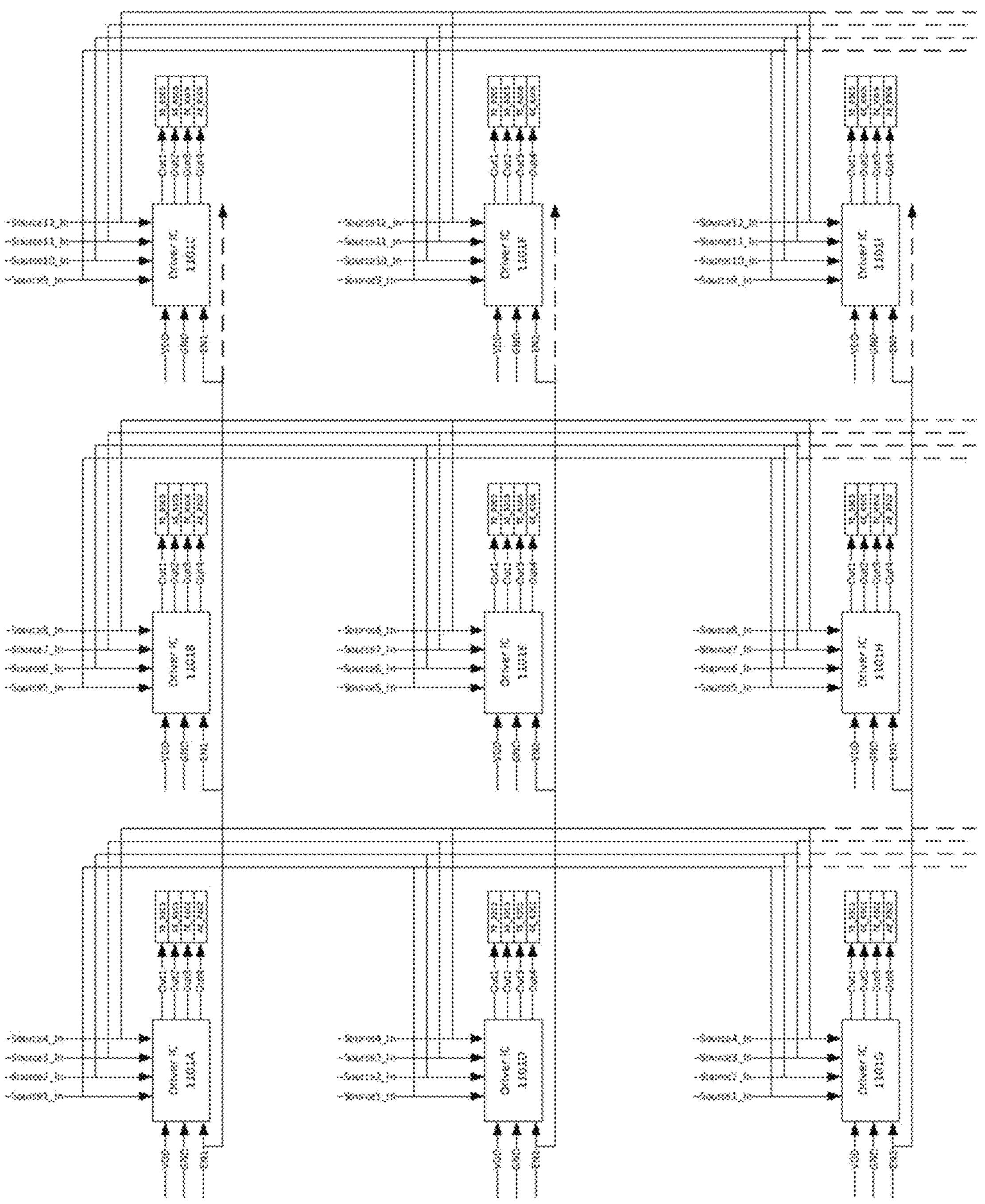
FIG. 11 illustrates some embodiments of a backplane.

FIG. 11 illustrates some embodiments of a backplane. Referring to FIG. 11, backplane includes a plurality of driver circuits 1101A-I. Note that FIG. 11 shows only a portion of the backplane, and the backplane would typically include many more driver circuits to drive all the antenna elements in a metasurface. In some embodiments, the driving of an antenna element, and its associated amplifier, includes sending a voltage signal to a tuning element and a voltage signal to the associated amplifier.

In some embodiments, the driver circuits are part of a matrix drive with a row and column typology. For example, driver circuits 1101A-1101C form one row, driver circuits 1101D-1101F form a second row, and driver circuits 1101G-1101I form a third row. Similarly, driver circuits 1101A, 1101D, and 1101G form a column, 1101B, 1101E, and 1101H form a second column, and driver circuits 1101C, 1101F, and 1101I form a third column.

In some embodiments, the matrix drive circuitry is coupled to the antenna elements of the metasurface, as well as amplifiers and tuning elements associated with each of the antenna elements. In some embodiments, the matrix drive circuitry is configured to drive individually each antenna element and its associated amplifier. In some embodiments, the matrix driver circuitry comprises multiple driver circuits in a row and column topology, each driver circuit outputs a pair of signals simultaneously to one antenna element of the plurality of antenna elements and its associated amplifier. The pair of signals including a first tuning signal to tune the one antenna element and a second amplifier signal to tune the associated amplifier. In some embodiments, each driver circuit is coupled to receive two source signals and generate the pair of signals to the one antenna element and its associated amplifier based on the two source signals. A more detailed view of one of the driver circuits that is used to tune one antenna element and its associated amplifier is described in more detail below.

Figure 12:
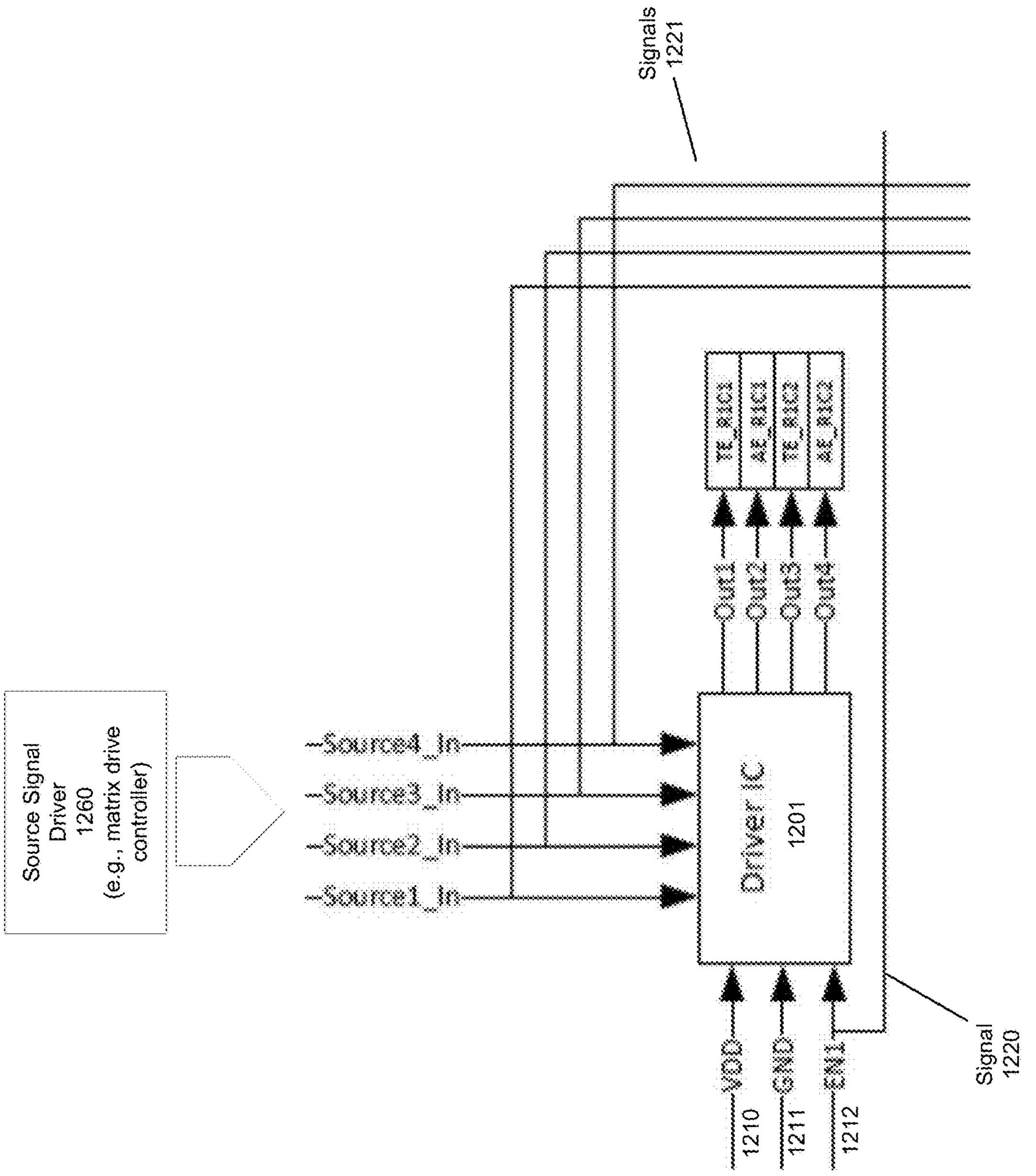
FIG. 12 illustrates an example of some embodiments of a driver circuit.

FIG. 12 illustrates an example of some embodiments of a driver circuit. Referring to FIG. 12, driver circuit 1201 receives a voltage input (VDD) 1210, a ground (GND) input 1211, and an enable (EN1) signal 1212. The driver circuit 1201 also receives source signals referred to as Source 1-4 and output signals referred to as Out1-4. In some embodiments, a source driver 1260 of a matrix drive controller drives the source signals. That is, in some embodiments, driver IC 1201 produces four output signals referred to herein as Out1-Out4. These represent two pairs of output signals, with each pair for one of the antenna elements. For example, in FIG. 12, Out1 and Out2 are for one antenna element, while Out3 and Out4 are for another antenna element. In the matrix, these two antenna elements may be row 1, column 1 and row 1, column 2. In each pair, one of the outputs signals is for tuning the antenna elements and one is for driving (tuning) its amplifier. For example, in the Out1/Out2 pair of output signals, Out1 is for tuning the antenna element, with a notation "TE", while Out2 is for tuning the amplifier, with notation "AE". In such embodiments, driver circuit 1201 provides control signals for two antenna elements with Out1 being a tuning enable signal for a first RF radiating antenna element, Out2 being an amplifier enable signal for the first RF radiating antenna element, Out3 being the tuning element enable signal for a second RF radiating antenna element, and Out4 being an amplifier enable signal for the amplifier for the second RF radiating antenna element. Therefore, each driver IC 1201 is responsible for driving the two antenna elements and their associated amplifiers, and each amplifier can be individually addressed. Note that in some other embodiments, driver IC 1201 can produce more (or less) outputs signals than the four shown to control (e.g., drive) more (or less) antenna elements.

In some embodiments, the source signals Source 1-4 correspond directly to the outputs1-4, such that when driver circuit 1201 is enabled by enable signal 1212, the voltages on source signals Source1-4 are output on output signals Out1-4, respectively. That is, the voltage on Source1 is output on Out1 as the tuning element enable signal for the first RF radiating antenna element, the voltage on Source2 is output onto Out2 as the amplifier enable signal for the first RF radiating antenna element, the voltage on Source3 is output on Out3 as the tuning element enable signal for the second RF radiating antenna element, and Source4 is output on Out4 as the amplifier enable signal for the second RF radiating antenna element. In this manner, the source signals of the driver circuit 1201 control the tuning and amplification of two RF radiating antenna elements.

In some embodiments, enable input 1212 for all the driver circuits in a row in the row and column typology are coupled together as illustrated in FIG. 11 and with signal 1220 in FIG. 12. In this way, the EN1 enable signal 1212 acts as a row driver. Similarly, the source signals Source1-4 for all the driver circuits in each column in the row and column typology are coupled together as shown in FIG. 11 and with signals 1221 in FIG. 12. In this way, the source signals Source1-4 operate as a column driver.

In some embodiments, the output signal to the amplifier from the driver IC 1201 tunes the amplifier. For example, in some embodiments, the voltage of the output signal can be varied to adjust the amount of amplification the amplifier provides. The voltage of the output signal is varied by varying the voltage from the source signal. Therefore, if a 1×, 2×, etc. amplification is desired, then the source signal can be adjusted accordingly to produce an output signal (e.g., Out2) to achieve the amplification.

In some embodiments, as shown in the figure above with the multiple driver ICs, the source signals for each column of driver ICs are coupled together. For example, the Source1_In signals for all the driver ICs in the same column are coupled together. The coupling is the same for Source2_In through Source4_In. Therefore, during operation, the controller tunes each element in a particular row and then moves to the next row, proceeding through the matrix.

The backplane matrix-driven amplifier arrangement disclosed herein has several benefits. These benefits include reduced cost. This is due to the reduced number of circuits to drive the amplifiers, which in some embodiments obviates the need for separate drivers for the amplifiers. The arrangement described with respect to the above embodiments, can use a single source driver to drive many driver ICs, with some drivers to provide gating, thereby reducing the number of components needed and thus the cost. Because the number of components is reduced, the power consumption of such an arrangement is reduced as well, compared to other types of antennas such as phased array antennas with the same number of antenna elements. The power consumption is also reduced on the back end due to a reduced number of BUC converters need for the antenna.

Figure 13:
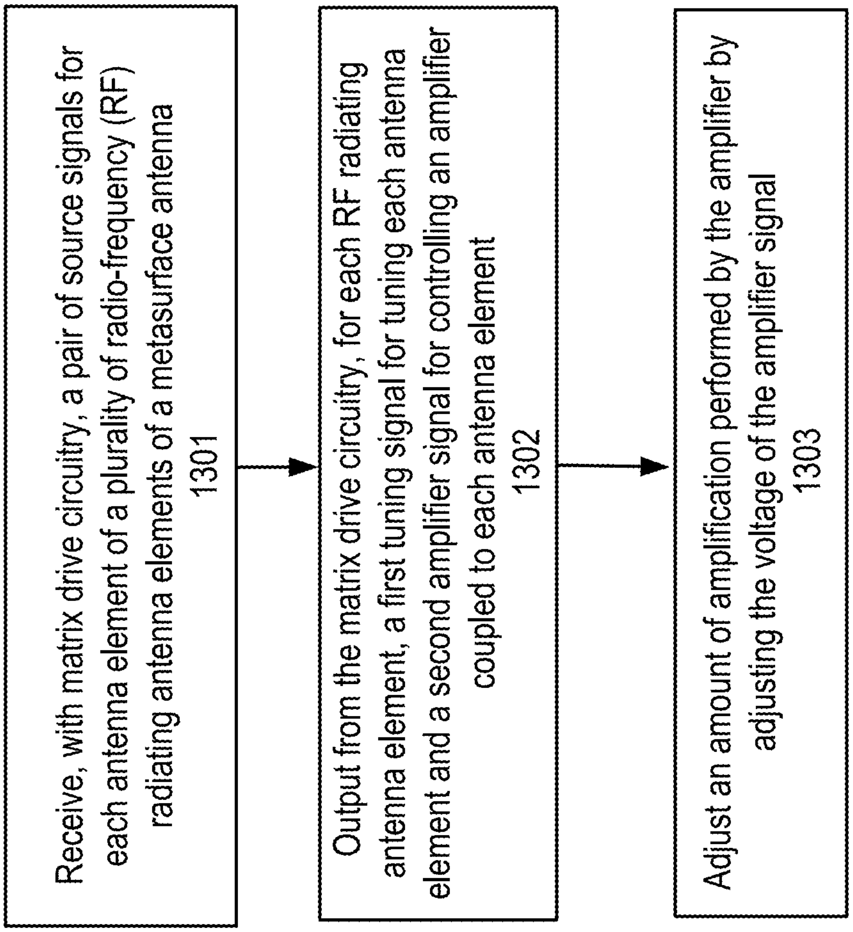
FIG. 13 is a data flow diagram of some embodiments of a process for controlling antenna elements.

FIG. 13 is a data flow diagram of some embodiments of a process for controlling antenna elements. The antenna elements are part of a metasurface antenna. The process is performed by processing logic that may comprise hardware (circuitry, dedicated logic, etc.), software (such as is run on a general-purpose computer system or a dedicated machine), firmware, or a combination of the three.

Referring to FIG. 13, the process includes processing logic receiving, with matrix drive circuitry, a pair of source signals for each antenna element of a plurality of radio-frequency (RF) radiating antenna elements of a metasurface antenna (processing block 1301). After receiving the source signals, processing logic outputs from the matrix drive circuitry, for each antenna element of the plurality of radio-frequency (RF) radiating antenna elements, a first tuning signal for tuning each antenna element and a second amplifier signal for controlling an amplifier coupled to each antenna element (processing block 1302). In some embodiments, the first tuning signal and the second amplifier signal are output simultaneously. In some embodiments, the matrix drive circuitry includes multiple driver circuits in a row and column topology, and further comprising outputting, by one of the driver circuits, the pair of source signals as the first tuning signal and the second amplifier signal in response to the one driver circuit being enabled.

In some embodiments, a first source signal of the two source signals is related to the first tuning signal and a second source signal of the two source signals is related to the second amplifier signal, and further comprising wherein the first source signal for driver circuits in a column in the matrix drive circuitry are coupled together and the second source signals for driver circuits in the column are coupled together. In such a case, in some embodiments, the process further comprises driving the first source signals in each column in the matrix drive circuitry at a same time and comprising driving the second source signals in each column in the matrix drive circuitry at the same time.

In some embodiments, the process further comprises adjusting an amount of amplification performed by the amplifier by adjusting the voltage of the second amplifier signal (processing block 1303). This adjustment can be done by adjusting voltage of one of the source signals received by the driver circuit.

There is a number of example embodiments described herein.

Example 1 is a metasurface antenna comprising: a plurality of radio-frequency radiating antenna elements; a plurality of tuning elements coupled to the plurality of radio-frequency radiating antenna elements, wherein each tuning element of the plurality of tuning elements is associated with one antenna element of the plurality of antenna elements; a plurality of amplifiers coupled to the plurality of radio-frequency radiating antenna elements, wherein each amplifier of the plurality of amplifiers is associated with one antenna element of the plurality of antenna elements; and a drive circuitry coupled to the plurality of antenna elements, the plurality of amplifiers and the plurality of tuning elements, configured to drive individually each of the plurality of antenna elements and the plurality of amplifiers.

Example 2 is the antenna of example 1 that may optionally include that the driver circuitry comprises a plurality of driver circuits, each driver circuit of the plurality of driver circuits operable to output a pair of signals to one antenna element of the plurality of antenna elements and its associated amplifier, the pair of signals including a tuning signal to tune the one antenna element and an amplifier signal to tune the associated amplifier.

Example 3 is the antenna of example 2 that may optionally include that each driver circuit is coupled to receive two source signals and generate the pair of signals to the one antenna element and its associated amplifier based on the two source signals.

Example 4 is the antenna of example 3 that may optionally include that the drive circuitry comprises matrix drive circuitry and the plurality of driver circuits are in a row and column topology, and further wherein the source signals operate as a column driver, said each driver circuit having an enable input to enable said driver circuit to output the pair of signals, the enable input to operate as a row driver.

Example 5 is the antenna of example 4 that may optionally include that a first source signal of the two source signals is related to the tuning signal and a second source signal of the two source signals is related to the amplifier signal, and further wherein the first source signal for the driver circuits in a column are coupled together and the second source signals for the driver circuits in the column are coupled together.

Example 6 is the antenna of example 2 that may optionally include that each driver circuit is configured to receive two pairs of source signals and generate two pairs of output signals to tune two antenna elements of the plurality of antenna elements and each of their associated amplifiers of the plurality of amplifiers.

Example 7 is the antenna of example 2 that may optionally include that voltage of the amplifier signal controls an amount of amplification produced by the associated amplifier and is adjustable to adjust the amount of amplification.

Example 8 is the antenna of example 7 that may optionally include that each driver circuit is coupled to receive two source signals to generate the tuning signal and the amplifier signal, with voltage of one of the source signals being adjustable to adjust the amplifier signal to adjust the amount of amplification.

Example 9 is the antenna of example 1 that may optionally include that the tuning element comprises a varactor.

Example 10 is the antenna of example 1 that may optionally include a stack up having: a glass substrate coupled to at least a portion of each of the plurality of antenna elements, wherein tuning elements of the plurality of tuning elements are coupled to a first side of the glass substrate; an iris metal layer coupled to a second side of the glass substrate opposite the first side, the iris metal layer forming a plurality of irises of the plurality of antenna elements, wherein each of the tuning elements is electrically connected to the iris metal layer using a via through the glass substrate; an upper feed dielectric connected to the iris metal layer; a directional coupler connected to the first feed dielectric; and a lower feed dielectric connected to the directional coupler.

Example 11 is the antenna of example 1 that may optionally include a plurality of vias, wherein each antenna element of the plurality of antenna elements includes an iris, one of the plurality of tuning elements is coupled across the iris, and the plurality of vias are positioned around a perimeter of the iris to decouple the iris from one or more adjacent irises.

Example 12 is the antenna of example 11 that may optionally include that the plurality of vias include a first set of vias around the perimeter toward a first end of the iris and a second set of vias around the perimeter toward a second end of the iris.

Example 13 is the antenna of example 11 that may optionally include that the plurality of vias include a first set of vias forming a via wall between the iris and an adjacent iris.

Example 14 is the antenna of example 11 that may optionally include that the plurality of vias include at least one via with a patch on its top.

Example 15 is the antenna of example 1 that may optionally include a first substrate coupled to at least a portion of each of the plurality of antenna elements, wherein at least one antenna element of the plurality of antenna elements comprises: a radiating patch coupled to a first side of the substrate, with its associated tuning element and amplifier coupled to the radiating patch; an iris formed in a metal layer on a second side of the substrate opposite the first side; and a feed stack connected to the metal layer.

Example 16 is the antenna of example 15 that may optionally include that each driver circuit is implemented on the first substrate.

Example 17 is the antenna of example 15 that may optionally include that the tuning element, amplifier, and said each driver circuit for antenna elements of the plurality of antenna elements are integrated in a single chip.

Example 18 is the antenna of example 17 that may optionally include that the chip is in a carrier substrate electrically connected to a metal layer on the first side of the first substrate.

Example 19 is the antenna of example 1 that may optionally include a first substrate coupled to at least a portion of each of the plurality of antenna elements, wherein at least one antenna element of the plurality of antenna elements comprises: a radiating element coupled to a first side of the substrate, with its associated amplifier coupled to the radiating element; and an iris formed in a metal layer on a second side of the substrate opposite the first side, with its associated tuning element coupled across the iris.

Example 20 is the antenna of example 1 that may optionally include a first substrate coupled to at least a portion of each of the plurality of antenna elements, wherein at least one antenna element of the plurality of antenna elements comprises: a radiating element coupled to a first side of the substrate, with its associated amplifier coupled to the radiating element; and an iris formed in a metal layer on a second side of the substrate opposite the first side, with its associated tuning element coupled across the iris.

Example 21 is the antenna of example 1 that may optionally include a first substrate coupled to at least a portion of each of the plurality of antenna elements and a second substrate with a decoupling ground plane between the first and second substrates, wherein the tuning element comprises a varactor, a MEMs device, or a pin diode and at least one antenna element of the plurality of antenna elements comprises: a radiating element coupled to a first side of the first substrate and coupled to its associated amplifier with a via through the first substrate, the associated amplifier coupled to a first side of the second substrate; and an iris formed in metal layer on a second side of the second substrate opposite the first side of the second substrate, with its associated tuning element coupled across the iris.

Example 22 is a method comprising: receiving, with drive circuitry, a pair of source signals for each antenna element of a plurality of radio-frequency (RF) radiating antenna elements of a metasurface antenna; and outputting from the drive circuitry, for said each antenna element of the plurality of radio-frequency (RF) radiating antenna elements, a tuning signal for tuning said each antenna element and an amplifier signal for controlling an amplifier coupled to said each antenna element.

Example 23 is the method of example 22 that may optionally include that the tuning signal and the amplifier signal are output simultaneously.

Example 24 is the method of example 22 that may optionally include that the drive circuitry includes a plurality of driver circuits, and further comprising outputting, by one of the driver circuits, the pair of source signals as the tuning signal and the amplifier signal in response to the one driver circuit being enabled.

Example 25 is the method of example 24 that may optionally include that a first source signal of the two source signals is related to the tuning signal and a second source signal of the two source signals is related to the amplifier signal, and wherein the drive circuitry comprises matrix drive circuitry and the plurality of driver circuits are in the row and column topology, and further comprising wherein the first source signal for driver circuits in a column in the matrix drive circuitry are coupled together and the second source signals for driver circuits in the column are coupled together, and further comprising driving the first source signals in each column in the matrix drive circuitry at a same time and comprising driving the second source signals in each column in the matrix drive circuitry at the same time.

Example 26 is the method of example 22 that may optionally include adjusting an amount of amplification performed by the amplifier by adjusting the voltage of the amplifier signal.

Example 27 is the method of example 26 that may optionally include adjusting the voltage of the amplifier signal by adjusting voltage of one of the source signals.

Example 28 is a metasurface antenna comprising: a plurality of radio-frequency radiating antenna elements, each of the plurality of RF radiating antenna elements including a radiating element and a coupling iris; a plurality of tuning elements coupled to the plurality of radio-frequency radiating antenna elements, wherein each tuning element of the plurality of tuning elements is associated with an antenna element of the plurality of antenna elements; a plurality of amplifiers coupled to the plurality of radio-frequency radiating antenna elements, wherein each amplifier of the plurality of amplifiers is associated with an antenna element of the plurality of antenna elements; and a plurality of driver circuits, each driver circuit of the plurality of driver circuits to output a pair of signals to one antenna element of the plurality of antenna elements and its associated amplifier, the pair of signals including a tuning signal to tune the one antenna element and an amplifier signal to tune the associated amplifier, wherein the tuning element, amplifier, and said each driver circuit for each antenna element of the plurality of antenna elements are integrated in a single chip that is coupled to the radiating element of said each antenna element and to a transmission line that extends over the coupling iris.

All the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, “can,” “could,” “might,” “may,” “e.g.,” and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms “comprising,” “including,” “having,” and the like are synonymous and are used inclusively, in an open-ended fashion, and do not exclude additional elements, features, acts, operations, and so forth. Also, the term “or” is used in its inclusive sense (and not in its exclusive sense) so that when used, for example, to connect a list of elements, the term “or” means one, some, or all the elements in the list.

Disjunctive language such as the phrase “at least one of X, Y, or Z,” unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

We claim:

1. A metasurface antenna comprising:

a plurality of radio-frequency radiating antenna elements;

a plurality of tuning elements coupled to the plurality of radio-frequency radiating antenna elements, wherein each tuning element of the plurality of tuning elements is associated with one antenna element of the plurality of antenna elements;

a plurality of amplifiers coupled to the plurality of radio-frequency radiating antenna elements, wherein each amplifier of the plurality of amplifiers is associated with one antenna element of the plurality of antenna elements; and a drive circuitry coupled to the plurality of antenna elements, the plurality of amplifiers and the plurality of tuning elements, configured to drive individually each of the plurality of antenna elements and the plurality of amplifiers.

2. The antenna of claim 1 wherein the driver circuitry comprises a plurality of driver circuits, each driver circuit of the plurality of driver circuits operable to output a pair of signals to one antenna element of the plurality of antenna elements and its associated amplifier, the pair of signals including a tuning signal to tune the one antenna element and an amplifier signal to tune the associated amplifier.

3. The antenna of claim 2 wherein said each driver circuit is coupled to receive two source signals and generate the pair of signals to the one antenna element and its associated amplifier based on the two source signals.

4. The antenna of claim 3 wherein the drive circuitry comprises matrix drive circuitry and the plurality of driver circuits are in a row and column topology, and further wherein the source signals operate as a column driver, said each driver circuit having an enable input to enable said driver circuit to output the pair of signals, the enable input to operate as a row driver.

5. The antenna of claim 4 wherein a first source signal of the two source signals is related to the tuning signal and a second source signal of the two source signals is related to the amplifier signal, and further wherein the first source signal for the driver circuits in a column are coupled together and the second source signals for the driver circuits in the column are coupled together.

6. The antenna of claim 2 wherein each driver circuit is configured to receive two pairs of source signals and generate two pairs of output signals to tune two antenna elements of the plurality of antenna elements and each of their associated amplifiers of the plurality of amplifiers.

7. The antenna of claim 2 wherein voltage of the amplifier signal controls an amount of amplification produced by the associated amplifier and is adjustable to adjust the amount of amplification.

8. The antenna of claim 7 wherein said each driver circuit is coupled to receive two source signals to generate the tuning signal and the amplifier signal, with voltage of one of the source signals being adjustable to adjust the amplifier signal to adjust the amount of amplification.

9. The antenna of claim 1 wherein the tuning element comprises a varactor.

10. The antenna of claim 1 further comprising a stack up having:

a glass substrate coupled to at least a portion of each of the plurality of antenna elements, wherein tuning elements of the plurality of tuning elements are coupled to a first side of the glass substrate;

an iris metal layer coupled to a second side of the glass substrate opposite the first side, the iris metal layer forming a plurality of irises of the plurality of antenna elements, wherein each of the tuning elements is electrically connected to the iris metal layer using a via through the glass substrate;

an upper feed dielectric connected to the iris metal layer;

a directional coupler connected to the first feed dielectric; and a lower feed dielectric connected to the directional coupler.

11. The antenna of claim 1, further comprising:

a plurality of vias, wherein each antenna element of the plurality of antenna elements includes an iris, one of the plurality of tuning elements is coupled across the iris, and the plurality of vias are positioned around a perimeter of the iris to decouple the iris from one or more adjacent irises.

12. The antenna of claim 11 wherein the plurality of vias include a first set of vias around the perimeter toward a first end of the iris and a second set of vias around the perimeter toward a second end of the iris.

13. The antenna of claim 11 wherein the plurality of vias include a first set of vias forming a via wall between the iris and an adjacent iris.

14. The antenna of claim 11 wherein the plurality of vias include at least one via with a patch on its top.

15. The antenna of claim 1 further comprising:

a first substrate coupled to at least a portion of each of the plurality of antenna elements, wherein at least one antenna element of the plurality of antenna elements comprises:

a radiating patch coupled to a first side of the substrate, with its associated tuning element and amplifier coupled to the radiating patch;

an iris formed in a metal layer on a second side of the substrate opposite the first side; and a feed stack connected to the metal layer.

16. The antenna of claim 15 wherein each driver circuit is implemented on the first substrate.

17. The antenna of claim 15 wherein the tuning element, amplifier, and said each driver circuit for antenna elements of the plurality of antenna elements are integrated in a single chip.

18. The antenna of claim 17 wherein the chip is in a carrier substrate electrically connected to a metal layer on the first side of the first substrate.

19. The antenna of claim 1 further comprising a first substrate coupled to at least a portion of each of the plurality of antenna elements, wherein at least one antenna element of the plurality of antenna elements comprises:

a radiating element coupled to a first side of the substrate, with its associated amplifier coupled to the radiating element; and an iris formed in a metal layer on a second side of the substrate opposite the first side, with its associated tuning element coupled across the iris.

20. The antenna of claim 1 further comprising a first substrate coupled to at least a portion of each of the plurality of antenna elements, wherein at least one antenna element of the plurality of antenna elements comprises:

a radiating element coupled to a first side of the substrate, with its associated amplifier coupled to the radiating element; and an iris formed in a metal layer on a second side of the substrate opposite the first side, with its associated tuning element coupled across the iris.

21. The antenna of claim 1 further comprising a first substrate coupled to at least a portion of each of the plurality of antenna elements and a second substrate with a decoupling ground plane between the first and second substrates, wherein the tuning element comprises a varactor, a MEMs device, or a pin diode and at least one antenna element of the plurality of antenna elements comprises:

a radiating element coupled to a first side of the first substrate and coupled to its associated amplifier with a via through the first substrate, the associated amplifier coupled to a first side of the second substrate; and an iris formed in metal layer on a second side of the second substrate opposite the first side of the second substrate, with its associated tuning element coupled across the iris.

22. A method comprising:

receiving, with drive circuitry, a pair of source signals for each antenna element of a plurality of radio-frequency (RF) radiating antenna elements of a metasurface antenna; and outputting from the drive circuitry, in response to the pair of source signals, for said each antenna element of the plurality of radio-frequency (RF) radiating antenna elements, a tuning signal for tuning said each antenna element with a tuning element and an amplifier signal for controlling an amplifier coupled to said each antenna element, the tuning element and the amplifier being located at said each antenna element.

23. The method of claim 22 wherein the tuning signal and the amplifier signal are output simultaneously.

24. The method of claim 22 wherein the drive circuitry includes a plurality of driver circuits, and further comprising outputting, by one of the driver circuits, the pair of source signals as the tuning signal and the amplifier signal in response to the one driver circuit being enabled.

25. The method of claim 24 wherein a first source signal of the two source signals is related to the tuning signal and a second source signal of the two source signals is related to the amplifier signal, and wherein the drive circuitry comprises matrix drive circuitry and the plurality of driver circuits are in the row and column topology, and further comprising wherein the first source signal for driver circuits in a column in the matrix drive circuitry are coupled together and the second source signals for driver circuits in the column are coupled together, and further comprising driving the first source signals in each column in the matrix drive circuitry at a same time and comprising driving the second source signals in each column in the matrix drive circuitry at the same time.

26. The method of claim 22 further comprising adjusting an amount of amplification performed by the amplifier by adjusting the voltage of the amplifier signal.

27. The method of claim 26 further comprising adjusting the voltage of the amplifier signal by adjusting voltage of one of the source signals.

28. A metasurface antenna comprising:

a plurality of radio-frequency radiating antenna elements, each of the plurality of RF radiating antenna elements including a radiating element and a coupling iris;

a plurality of tuning elements coupled to the plurality of radio-frequency radiating antenna elements, wherein each tuning element of the plurality of tuning elements is associated with an antenna element of the plurality of antenna elements;

a plurality of amplifiers coupled to the plurality of radio-frequency radiating antenna elements, wherein each amplifier of the plurality of amplifiers is associated with an antenna element of the plurality of antenna elements; and a plurality of driver circuits, each driver circuit of the plurality of driver circuits to output a pair of signals to one antenna element of the plurality of antenna elements and its associated amplifier, the pair of signals including a tuning signal to tune the one antenna element and an amplifier signal to tune the associated amplifier, wherein the tuning element, amplifier, and said each driver circuit for each antenna element of the plurality of antenna elements are integrated in a single chip that is coupled to the radiating element of said each antenna element and to a transmission line that extends over the coupling iris.

* * * * *